(12) United States Patent
He et al.

(10) Patent No.: US 11,714,563 B2
(45) Date of Patent: Aug. 1, 2023

(54) VOLATILE REGISTER TO DETECT POWER LOSS

(71) Applicant: Micron Technology, Inc., Boise, ID (US)

(72) Inventors: Deping He, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 9 days.

(21) Appl. No.: 17/574,044

(22) Filed: Jan. 12, 2022

(65) Prior Publication Data

US 2022/0253226 A1     Aug. 11, 2022

Related U.S. Application Data

(60) Provisional application No. 63/147,983, filed on Feb. 10, 2021.

(51) Int. Cl.
*G06F 12/00*     (2006.01)
*G06F 3/06*     (2006.01)

(52) U.S. Cl.
CPC .......... *G06F 3/0625* (2013.01); *G06F 3/0632* (2013.01); *G06F 3/0653* (2013.01); *G06F 3/0673* (2013.01)

(58) Field of Classification Search
CPC .... G06F 3/0625; G06F 3/0632; G06F 3/0653; G06F 3/0673
See application file for complete search history.

(56) References Cited

U.S. PATENT DOCUMENTS

2020/0110662 A1*  4/2020  Kuo .................... G06F 11/0793

* cited by examiner

*Primary Examiner* — Gurtej Bansal
(74) *Attorney, Agent, or Firm* — Holland & Hart LLP (57) ABSTRACT

Methods, systems, and devices for volatile register to detect power loss are described. The memory system may receive a command to enter a first power mode having a lower power consumption than a second power mode. The memory system may store data in a register associated with the memory system before entering the first power mode (e.g., a low-power mode). The memory system may receive a command to exit the first power mode. The memory system may determine whether the data stored in the register includes one or more errors. The memory system may select a reset operation to perform to exit the first power mode based on determining whether the data stored in the register includes one or more errors.

25 Claims, 5 Drawing Sheets

VOLATILE REGISTER TO DETECT POWER LOSS

CROSS REFERENCE

The present Application for Patent claims priority to U.S. Provisional Patent Application No. 63/147,983 by He et al., entitled "VOLATILE REGISTER TO DETECT POWER LOSS", filed Feb. 10, 2021, which is assigned to the assignee hereof and is expressly incorporated by reference in its entirety herein.

FIELD OF TECHNOLOGY

The following relates generally to one or more systems for memory and more specifically to volatile register to detect power loss.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A memory system may wear out over time and may not be useful as a memory system after so many access operations. For example, when the memory system is power cycled, a quantity of reads and writes occur to move data from caches to more permanent data storage. The access operations can reduce the life of the memory system. Thus, repeatedly power cycling the memory system may reduce the lifetime of the memory system. Some host systems (such as battery-powered such as mobile phones, tablets or other mobile device) may power cycle the memory system multiple times a day as part of entering and exiting low-power modes to conserve energy. Such operations may introduce additional access operations to move data to and from caches as part of entering and exiting the low power mode and thereby reduce the life of the memory system. A power cycle may also cause a read disturb to internal data of the memory system where the data may not be able to be wear leveled, refreshed, or transferred to redundant blocks, thereby decreasing the efficiency and start-up time of performing operations and the overall performance of the memory system.

In some cases, the memory system may perform a reset operation to wake from a lower power state. Some memory systems may support multiple types of reset operations (e.g., a hard reset operation and a soft reset operation) that may involve different amounts of data movement. For example, the memory system may perform a hard reset to accommodate for a potential brown out condition, interruption, or power loss during the powered off state. In such cases, the memory system may perform the hard reset without identifying whether a power loss event (e.g., brown out condition, interruption, etc.) occurred. The memory system may be unaware of the state of the memory system or if the memory system is affected by power loss while in the powered off state. Performing hard resets without identifying an issue may increase the wear for the memory system to load internal data, thereby increasing the latency for start-up time and performing operations, decreasing the efficiency of the memory system, and decreasing the overall performance of the memory system.

Systems, devices, and techniques are described to improve the overall efficiency and operations of the memory system that experience power cycles and reset operations. In some memory systems, efficiency may be improved by storing data in a register of the memory system in response to receiving a command, from a host system, to enter a low power mode (e.g., powered off state, sleep state, etc.). The memory system may receive a command to exit the low power mode and check the register to determine whether the data includes one or more errors. The one or more errors may be a result of the memory system experiencing a brown out condition, an interruption, or a power loss during at least a portion of the low power mode. In such cases, the memory system may select a type of a reset operation to perform (e.g., a hard reset operation or a soft reset operation) based on whether the data includes one or more errors. For example, the memory system may perform a hard reset if the memory system determines that the data includes one or more errors. In other examples, the memory system may perform a soft reset if the memory system determines that the data fails to include one or more errors.

Performing the soft reset instead of a hard reset may reduce the quantity of access operations that are implemented as part of the reset operation, thereby decreasing the power consumption of the operation and decrease the amount of wear put on the memory system by reset operation. In some examples, determining whether the data includes one or more errors prior to performing a reset operation may increase the reliability and security of the memory system, thereby allowing the memory system or other components to perform operations at improved speeds, efficiency, and performance. In such cases, determining whether the memory system may be affected by a power loss event during the low power mode may decrease a wake up time from the low power mode and increase a reliability of performing the appropriate reset operation based on the conditions of the memory system. In some instances, a soft reset operation may take less time than a hard reset operation, which may decrease the amount of time it takes to fulfill a command sent by the host system when exiting a low power mode.

Features of the disclosure are initially described in the context of systems as described with reference to FIG. 1. Features of the disclosure are described in the context flow diagrams as described with reference to FIGS. 2-3. These and other features of the disclosure are further illustrated by and described with reference to an apparatus diagram and flowcharts that relate to volatile register to detect power loss as described with reference to FIGS. 4-5.

Figure 1:
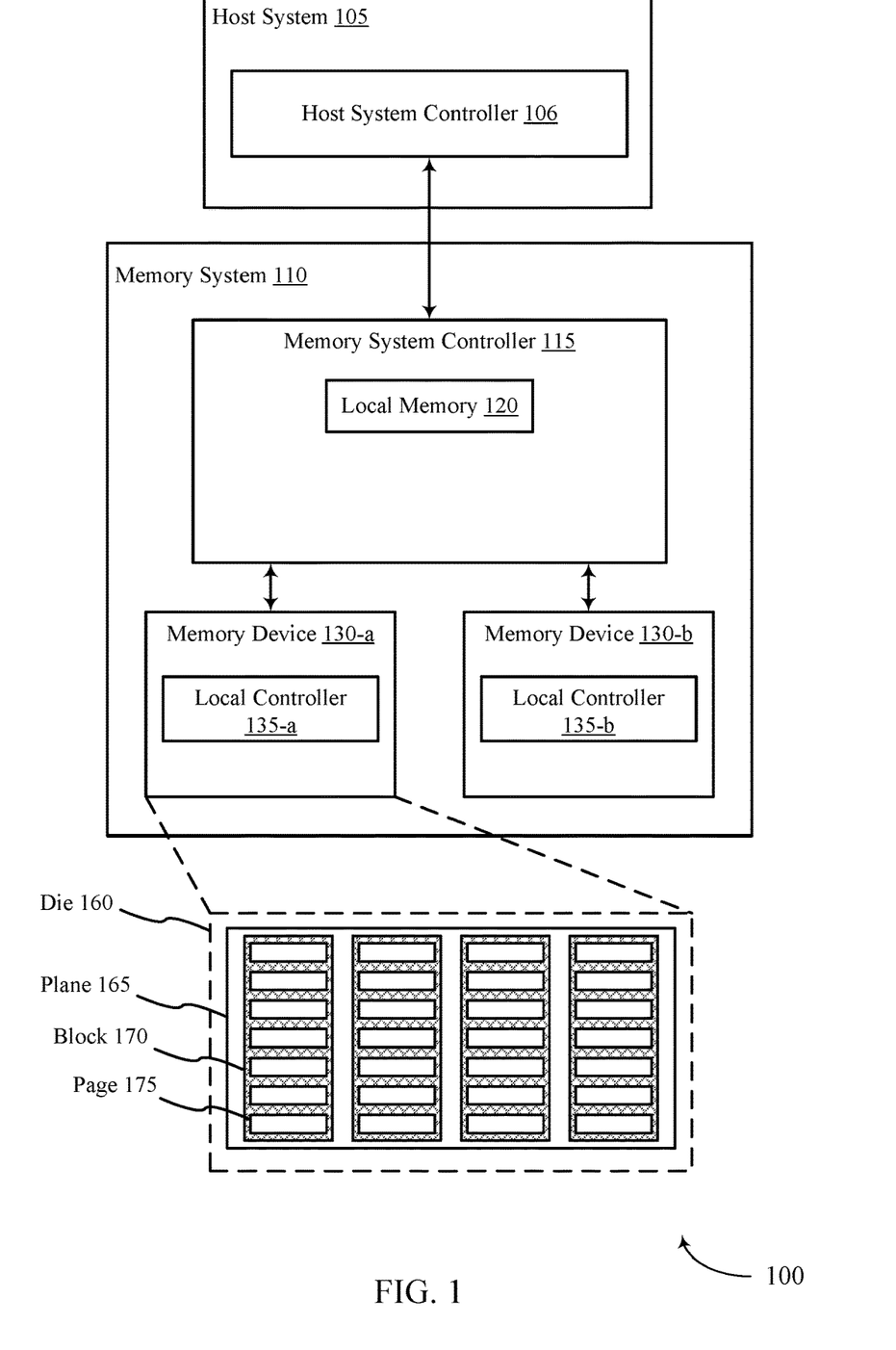
FIG. 1 illustrates an example of a system that supports volatile register to detect power loss in accordance with examples as disclosed herein.

FIG. 1 illustrates an example of a system 100 that supports volatile register to detect power loss in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support volatile register to detect power loss. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

The memory system 110 may receive, from the host system 105, a command to enter a low power mode. In response to receiving the command, the memory system 110 may store, in a register associated with the memory system 110, data associated with the memory system 110. The register may be an example of a NAND trim register. In some cases, the register may be volatile register. The memory system 110 may receive, from the host system 105, a different command to exit the low power mode based on storing the data. In some cases, the memory system 110 may determine whether the data stored in the register includes one or more errors based on receiving the command to exit the low power mode. The memory system 110 may select the type of a reset operation to perform to exit the low power mode based on determining whether the data includes the one or more errors. As part of being a low-power mode, normal maintenance operations may not have been applied to various aspects of the memory system (e.g., RAMs or caches of the memory system 110). The information in those memories may have become corrupted, especially as the length of time the memory system 110 is in the low-power state gets longer. If errors exist in the register, the memory system 110 may select a hard reset operation to reload information from the NAND into some of those memories to ensure that the memory system 110 operates properly. If, however, errors are not present in the data in the register, the memory system 110 may perform a soft reset operation, which does not transfer as much data from the NAND to the caches and thereby takes less time, uses less power, and implements fewer read and write operations. The reset operation may be an example of a hard reset operation or a soft reset operation.

In some cases, the memory system 110 may enable a voltage detector of the memory system 110 to set brown out voltage levels, detect brown out voltage levels on the voltage rail of the system 100, detect an amount of power loss during the low power mode, or a combination thereof. After the memory system enters a sleep mode (e.g., low power mode), the memory system 110 may check the register. If the amount of power lost during the low power mode satisfies (e.g., exceeds) a threshold, the memory system 110 may determine that the data stored in the register is corrupt (e.g., includes one or more errors). In such cases, the memory system 110 may perform a hard reset operation. If the amount of power lost during the low power mode fails to satisfy (e.g., is below or equal to) the threshold, the memory system 110 may determine that the data stored in the register is not corrupt (e.g., does not includes one or more errors). In such cases, the memory system 110 may perform a soft reset operation. Performing a hard reset or soft reset based on the data stored in the register may improve the performance of the overall memory system and the reliability of the reset operation.

Figure 2:
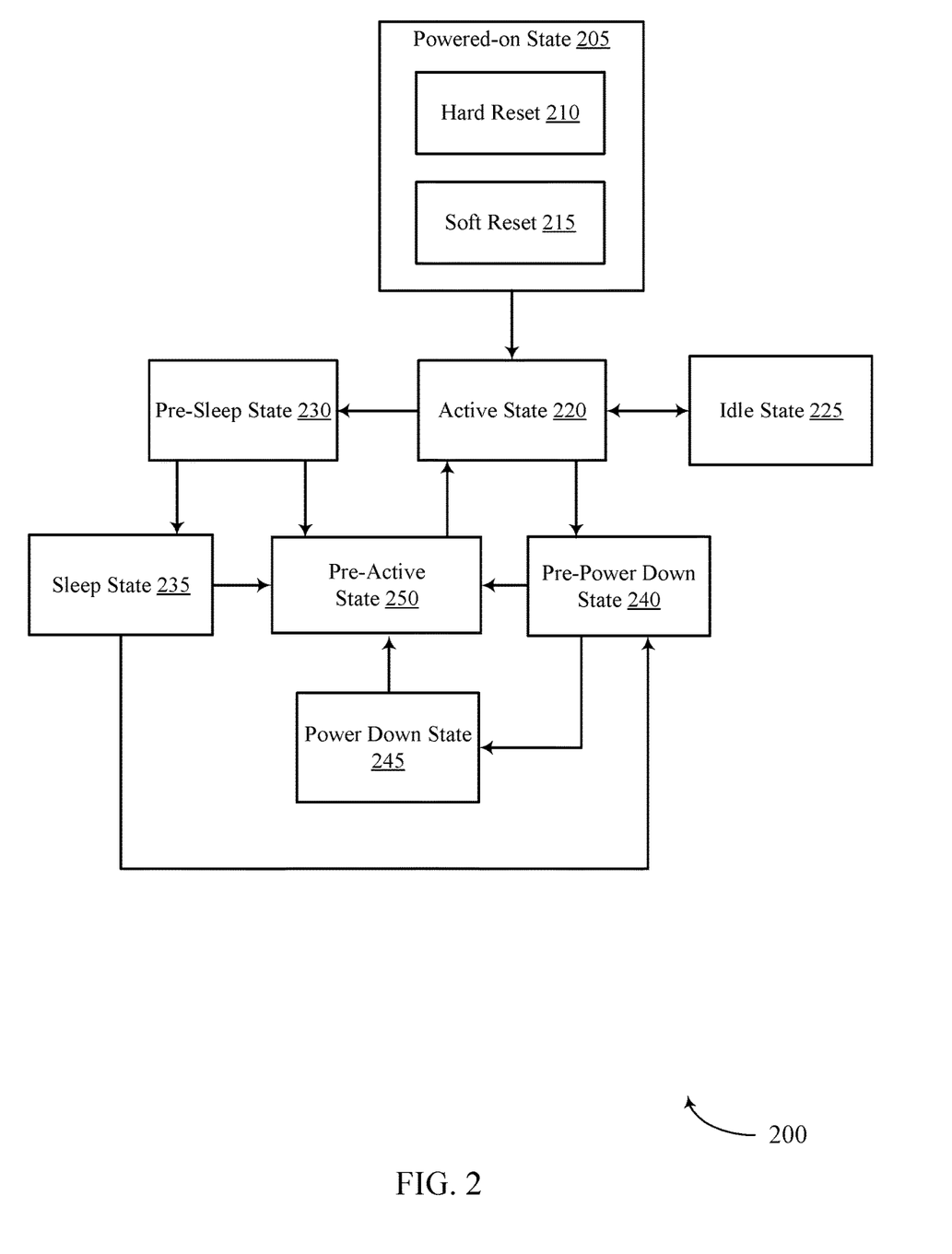
FIG. 2 illustrates an example of a state diagram that supports volatile register to detect power loss in accordance with examples as disclosed herein.

FIG. 2 illustrates an example of a state diagram 200 that supports volatile register to detect power loss in accordance with examples as disclosed herein. The state diagram 200 may include a plurality of different states of memory system. For example, the state diagram may include a powered-on state 205, an active state 220, an idle state 225, a pre-sleep state 230, a sleep state 235, a pre-power down state 240, a power down state 245, and a pre-active state 250.

The idle state 225 may be an example of the memory system refraining from performing operations (e.g., read, write, or erase operations) of the memory system. The memory system may transition from the idle state 225 to the active state 220. The active state 220 may an example of the memory system performing a read, write, or erase operation. The memory system may enter the pre-sleep state 230 after exiting the active state 220. The pre-sleep state 230 may be an example of a memory system preparing to enter the sleep state 235. In such cases, the memory system may begin to refrain from performing operations or perform operations at reduced speeds. In some examples, the memory system may transition from the pre-sleep state 230 to the sleep state 235. The sleep state 235 may be an example of a low power state.

The memory system may receive a command to enter the pre-power down state 240 after the sleep state 235. The pre-power down state 240 may be an example of a state where the memory system prepares for the power down state 245. In such cases, the memory system may begin to turn off (e.g., shut down) portions of the memory system. The power down state 245 may be an example of a state where the memory system enters a shutdown mode. The memory system may enter the pre-active state 250 after the pre-sleep state 230, the sleep state 235, the pre-powered down state 240, or the power down state 245. The memory system may enter the pre-active state 250 prior to entering the active state 220. The pre-active state 250 may be an example of a state where the memory system begins to turn on portions of the memory system that may be powered off in the power down state 245 or may be in a sleep mode in the sleep state 235.

The memory system may receive a command to exit the active state 220 and enter the powered-on state 205. To enter the powered-on state 205, the memory system may perform a reset operation. The reset operation may mitigate the effects of an interruption or power loss during the powered-on state 205. In such cases, the powered-on state 205 may be an example of state where the memory system may perform operations (e.g., reset operations). For example, the powered-on state may include a hard reset 210 and a soft reset 215. The memory system may use reset commands to exit a low power mode. A low power mode may be an example of the idle state 225, pre-sleep state 230, the sleep state 235, the pre-power down state 240, and the power down state 245. The low power mode may have a lower power consumption than the powered-on state 205.

The hard reset 210 may be an example of a hard reset operation (e.g., FDh), and the soft reset 215 may be an example of a soft reset operation (e.g., FFh). The hard reset 210 may be an example of an operation that resets one or more settings that are unaffected by a soft reset 215. The one or more settings may be an example of a power-on initialized state, a data retrieval, an erase operation, or a combination thereof. In some cases, the hard reset 210 may be used to put a particular die (e.g., logical unit (LUN)) into a condition that may be similar to a power-on initialized state. In some cases, the hard reset 210 may initialize some or all parameters and configurations of a target LUN to default values. The hard reset 210 may include retrieving information from a ROM or more permanent storage (e.g., NAND) for the information used by the memory system to operate the memory system (e.g., trim parameters among other types of information). In such cases, the hard reset 210 may restore the memory system to an original state by erasing the information stored within one or more caches of the memory system.

The soft reset 215 may be an example of an operation that refrains from resetting one or more settings that are reset by a hard reset 210. In some cases, a soft reset 215 may be used to put a target into a known condition (but not necessarily default conditions) or to about command sequences in progress or both. For example, some information that is transferred from ROM or more permanent memory (e.g., NAND) to one or more caches may not be transferred as part of soft reset, thereby reducing a quantity of access operations performed as compared with a hard reset. The soft reset 215 may include powering on the memory system during the powered-on state 205.

The memory system may experience multiple hardware resets and power mode (e.g., state) changes. In some cases, the memory system may experience power cycles performed on the memory system which may wear out the memory system over time due to the read operations and write operations performed as part of the power cycles. In some examples, each power cycle may cause the memory system to experience a read disturb to internal data of the memory system that may be fixed in an internal physical block. During a power cycle, power may be repeatedly removed from the memory system, thereby limiting the lifetime of the memory system. In other examples, the memory system may experience a power up procedure (e.g., exiting the power down state 245). During the power up procedure, the memory system may experience increased lag times and latency due to the amount of data to load from the memory system. In some cases, the memory system may load data from the NAND during the power-up procedure. For example, the memory system may load a bootup code during the power-up procedure.

The memory system may experience a brown out event, an interruption, or a power loss during the low power mode. The memory system may reboot during a hardware reset (e.g., hard reset 210) and may be unaware of the state of the memory system or power state. In some cases, the memory system may be unaware if the memory may be affected by power loss while in low power state. In such cases, the memory system may perform a hard reset 210. The hard reset 210 may shorten the life of the memory system by increasing the wear of the memory system and increasing the latency after exiting the low power mode. The memory system may refrain from performing the soft reset 215 based on the memory system being unaware of potential power loss or interruptions during the low power mode. In such cases, the memory system may not perform the soft reset 215 blindly (e.g., without knowledge of the data stored in a register of the memory system). Rather, the memory system may be configured to perform hard reset 210 operations blindly (e.g., in the case of brown-out conditions) rather than performing a soft reset 215 operation.

Techniques are described to improve wake up latency and performance of the memory system, thereby improving the overall efficiency and operations of the memory system. For example, the memory system may receive a command to enter the low power mode. The memory system may store data (e.g., dummy data) in a register of the memory system in response to receiving the command. The memory system may receive a command to exit the low power mode. As part of exiting the low power mode, the memory system may determine whether the data (e.g., dummy data) stored in the register includes one or more errors. Based on the determination, the memory system may select which type of reset operation (e.g., a hard reset 210 or a soft reset 215) to use to exit the low power mode. For example, the memory system may perform a hard reset 210 in response to determining that the data includes one or more errors. The memory system may perform a soft reset 215 in response to determining that the data fails to include one or more errors.

In some cases, the memory system may be unaware of a power loss or interruption that may occur during the low power mode. In such cases, the memory system may enable a voltage detector to detect brown out voltage levels on a voltage rail of the memory system. The memory system may check the voltage detector to determine whether the memory system experienced a power loss event or interruption and perform the reset operation based on the determination.

If the register includes unchanged data (e.g., the data does not include errors) and the voltage detector is not tripped, then the memory system may exit the low power mode by performing the soft reset 215. If the register includes changed data (e.g., including errors), then the memory system may exit the low power mode by performing the hard reset 210. If voltage detector is tripped, then the memory system may exit the low power mode by performing the hard reset 210. If the register includes changed data (e.g., including errors) and the voltage detector is tripped, then the memory system may exit the low power mode by performing the hard reset 210. In such cases, the memory system may detect a power-on event (e.g., after power was lost) as compared to a pass-through powered-on state 205 (e.g., the memory device does not experience a power loss).

In some examples, storing the data in the register and performing the reset operation based on determining whether the stored data includes one or more errors may increase the reliability and security of the memory system, thereby allowing the memory system or other components to perform operations at improved speeds, efficiency, and performance. By performing a reset operation based on the data, the memory system may experience decreased wake up latency (e.g., duration of time between exiting the low power mode and entering the powered-on state 205) and increased endurance of the memory system.

Figure 3:
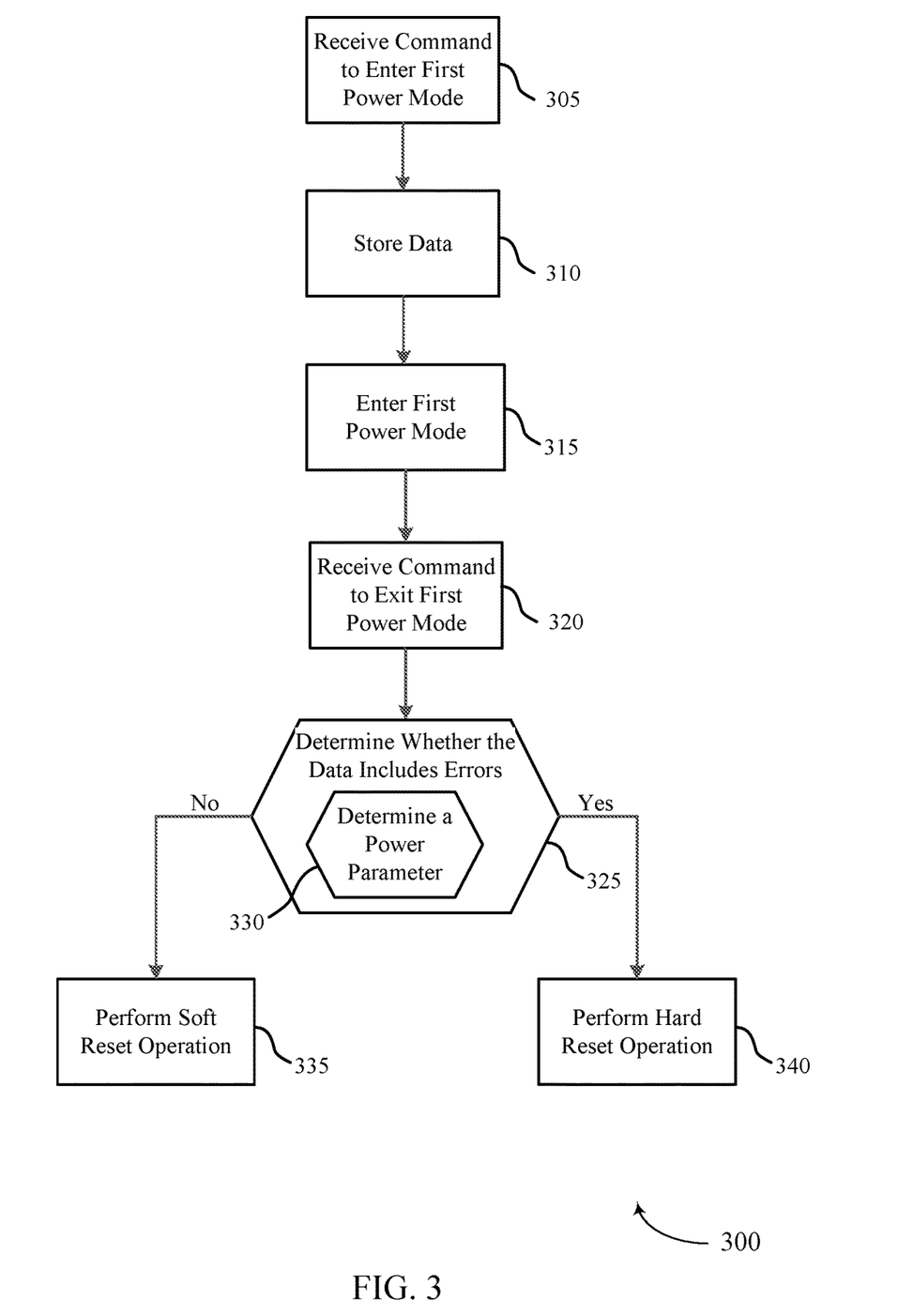
FIG. 3 illustrates an example of a flow diagram that supports volatile register to detect power loss in accordance with examples as disclosed herein.

FIG. 3 illustrates an example of a flow diagram 300 that supports volatile register to detect power loss in accordance with examples as disclosed herein. The operations of flow diagram 300 may be implemented by any device or its components as described herein. For example, the operations of flow diagram 300 may be performed by a memory system as described with reference to FIG. 1. Alternative examples of the following may be implemented, where some steps are performed in a different order or not at all. Some steps may additionally include additional features not mentioned below. The flow diagram 300 illustrates techniques where a memory system utilizes a volatile register to detect power loss.

Aspects of the flow diagram 300 may be implemented by a controller, among other components. Additionally or alternatively, aspects of the flow diagram 300 may be implemented as instructions stored in memory (e.g., firmware stored in a memory coupled with the memory system). For example, the instructions, when executed by a controller (e.g., the memory system controller 115), may cause the controller to perform the operations of the flow diagram 300.

At 305, a first command may be received. For example, the host system may transmit a first command to enter a first power mode having a lower power consumption than a second power mode. In such cases, the memory system may receive, from the host system, the first command. The first power mode may be an example of a sleep mode, a low power mode, an idle mode, or a combination thereof. The second power mode may be an example of an active mode, a powered-on mode, a reset mode, or a combination thereof.

At 310, data may be stored. For example, the memory system may store, in a register associated with the memory system, data associated with the memory system. In such cases, the memory system may set data into a NAND volatile trim register. In some examples, the memory system may determine that a voltage of the memory system satisfies a threshold in response to storing the data. For example, the memory system may detect brown out voltage levels on the voltage rail. In some cases, the memory system may detect a power loss associated with the memory system based on identifying that the voltage satisfies or exceeds a voltage threshold. A brown out voltage may be associated with a reduction in or restriction on the availability of electrical power in at least a portion of the memory system.

In some examples, the memory system may store the data in the register associated with the memory system after performing a soft reset operation. For example, the memory system may store the data after waking up (e.g., entering an active state or powered on state) following the soft reset operation. In some cases, a value of the data stored in the register may be hardcoded in ROM code, read from an eFUSE, or stored as the value in the register.

At 315, the first power mode may be entered. For example, the memory system may enter the first power mode in response to storing the data. The memory system may enter the sleep mode, the low power mode, an idle mode, or a combination thereof, based on storing the data in the register. In some cases, the memory system may store the data in the register after initialization of entering the first power mode, before entering the first power mode, or when the memory system enters the first power mode (e.g., at a same time). In some examples, entering the first power mode may be based on determining that the voltage of the memory system satisfies the threshold.

At 320, a second command may be received. For example, the host system may transmit a second command to exit the first power mode. In such cases, the memory system may receive, from the host system, a second command to exit the first power mode based on storing the data. The second command may be an example of a command to enter a powered-on mode, an active mode, a reset mode, or a combination thereof. In some cases, the memory system may receive the second command based on (e.g., in response to) entering the first power mode. In such cases, the memory system may receive the second command after entering the first power mode.

At 325, a determination may be made whether the data includes errors. For example, the memory system may determine whether the data stored in the register includes one or more errors (e.g., corrupt data). In some examples, the memory system may determine that the data includes the one or more errors based on receiving the second command. In some examples, the memory system 320 may determine that the data fails to include the one or more errors (e.g., data may not be corrupt) based on receiving the second command.

At 330, a power parameter may be determined. For example, the memory system may determine that a power parameter of the memory system fails to satisfy a threshold based on determining that the data fails to include the one or more errors. In some examples, the memory system may determine that the voltage detector of the memory system may not be tripped. For example, the memory system may determine that the memory system did not lose enough power to perform a hard reset operation.

In other examples, the memory system may determine that a power parameter of the memory system satisfies a threshold based on determining that the data includes the one or more errors. In some examples, the memory system may determine that the voltage detector of the memory system may be tripped. For example, the memory system may determine that the memory system lost enough power to perform a hard reset operation.

At 335, a soft reset operation may be performed. In some cases, the memory system may select which type of reset operation to perform (e.g., the soft reset operation or a hard reset operation). For example, the memory system may perform a reset operation to exit the first power mode based on determining whether the data stored in the register includes one or more errors based on receiving the second command. In such cases, the memory system may perform the reset operation based on determining whether the data stored in the register is corrupt. The memory system may exit the first power mode in response to performing the reset operation. For example, the memory system may perform the soft reset operation that refrains from resetting one or more settings that are reset by a hard refresh operation based on determining the power parameter fails to satisfy the threshold. In other examples, the memory system may perform the soft reset operation based on determining the data fails to include errors.

At 340, a hard reset operation may be performed. In some cases, the memory system may select which type of reset operation to perform (e.g., the soft reset operation or a hard reset operation). For example, the memory system may perform a reset operation to exit the first power mode based on determining whether the data stored in the register includes one or more errors based on receiving the second command. In such cases, the memory system may perform the reset operation based on determining whether the data stored in the register is corrupt. The memory system may exit the first power mode in response to performing the reset operation. In some cases, the memory system may perform the hard reset operation that resets one or more settings that are unaffected by a soft refresh in response to determining that the data includes one or more errors. The memory system may perform a hard reset operation based on determining the power parameter satisfies the threshold.

To perform the hard reset operation, the memory system may retrieve information from memory for the one or more settings that are reset. For example, the memory system may retrieve information from ROM during a power-up mode. The memory system may include one or more power cycles. In some examples, the powered-up mode may be an example of the reset mode. During the power-up mode, the memory system may operate at slower speeds than during the powered-on mode. To achieve faster operating conditions, the memory system may perform a reset operation and enter the powered-on mode.

Figure 4:
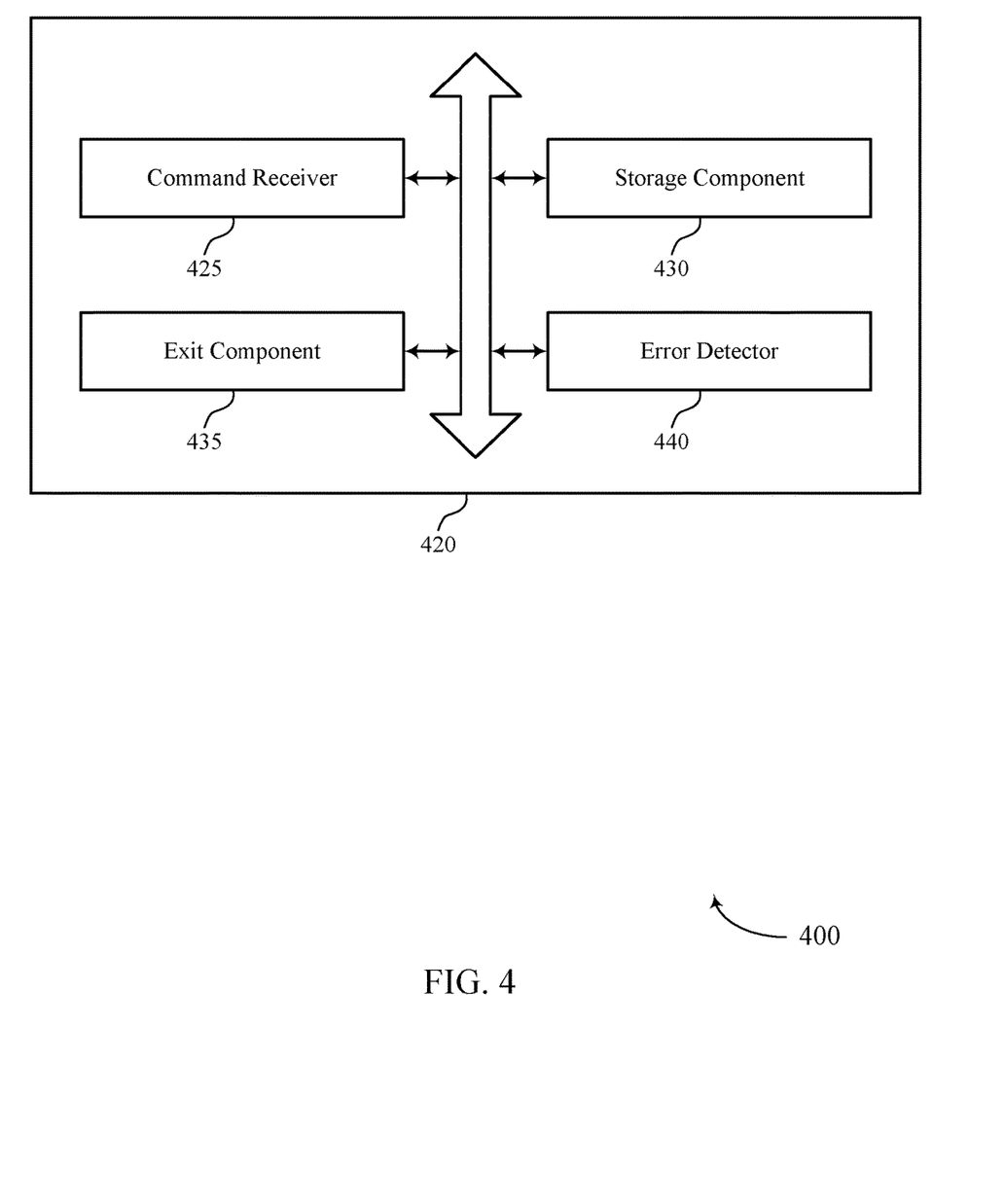
FIG. 4 shows a block diagram of a memory system that supports volatile register to detect power loss in accordance with examples as disclosed herein.

FIG. 4 illustrates an example of a block diagram 400 that supports volatile register to detect power loss in accordance with examples as disclosed herein. The memory system 420 may be an example of aspects of a memory system as described with reference to FIGS. 1 through 3. The memory system 420, or various components thereof, may be an example of means for performing various aspects of volatile register to detect power loss as described herein. For example, the memory system 420 may include a command receiver 425, a storage component 430, an exit component 435, an error detector 440, or any combination thereof. Each of these components may communicate, directly or indirectly, with one another (e.g., via one or more buses).

The command receiver 425 may be configured as or otherwise support a means for receiving, from a host system, a first command to enter a first power mode having a lower power consumption than a second power mode. The storage component 430 may be configured as or otherwise support a means for storing, in a register associated with the memory system, data associated with the memory system. The exit component 435 may be configured as or otherwise support a means for receiving, from the host system, a second command to exit the first power mode based at least in part on storing the data. The error detector 440 may be configured as or otherwise support a means for performing a reset operation to exit the first power mode based at least in part on determining whether the data stored in the register includes one or more errors based at least in part on receiving the second command.

In some examples, the command receiver 425 may be configured as or otherwise support a means for entering the first power mode based at least in part on storing the data, where receiving the second command is based at least in part on entering the first power mode.

In some examples, the storage component 430 may be configured as or otherwise support a means for retrieving information from memory for the one or more settings that are reset.

In some examples, the storage component 430 may be configured as or otherwise support a means for determining that a voltage of the memory system satisfies a threshold based at least in part on storing the data, where entering the first power mode is based at least in part on determining that the voltage of the memory system satisfies the threshold. In some examples, storing, in the register associated with the memory system, the data associated with the memory system occurs after performing the soft reset operation to enter the second power mode from the first power.

In some examples, the exit component 435 may be configured as or otherwise support a means for exiting the first power mode based at least in part on performing the reset operation.

Figure 5:
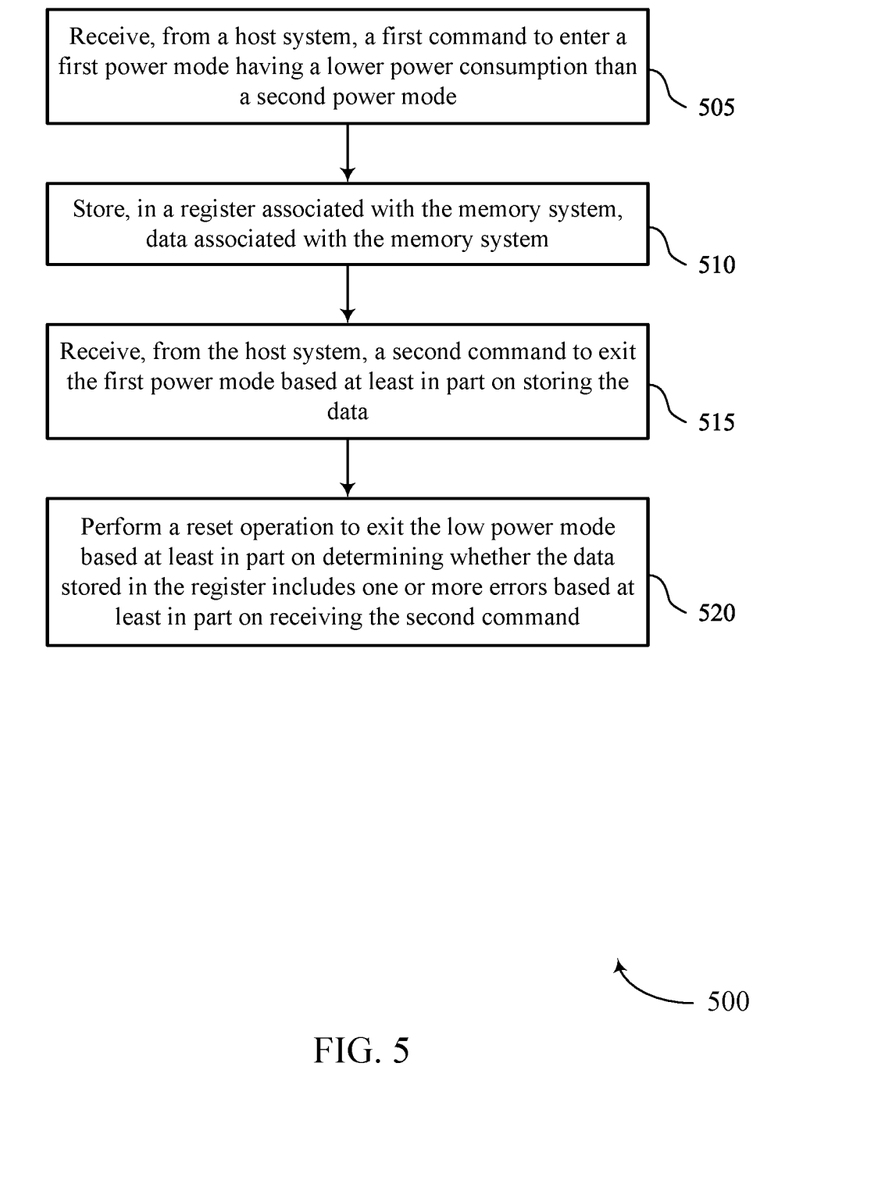
FIG. 5 shows a flowchart illustrating a method or methods that support volatile register to detect power loss in accordance with examples as disclosed herein.

In some examples, the error detector 440 may be configured as or otherwise support a means for determining that the data includes the one or more errors based at least in part on receiving the second command, where the reset operation comprises a hard reset operation that resets one or more settings that are unaffected by a soft refresh operation In some examples, the error detector 440 may be configured as or otherwise support a means for determining that the data fails to include the one or more errors based at least in part on receiving the second command, where performing the reset operation is based at least in part on determining that the data fails to include the one or more errors In some examples, the error detector 440 may be configured as or otherwise support a means for determining that a power parameter of the memory system fails to satisfy a threshold based at least in part on determining that the data fails to include the one or more errors, where the reset operation comprises a soft reset operation that refrains from resetting one or more settings that are reset by a hard refresh operation, and where performing the soft reset operation is based at least in part on determining the power parameter fails to satisfy the threshold In some examples, the error detector 440 may be configured as or otherwise support a means for determining that a power parameter of the memory system satisfies a threshold based at least in part on determining that the data includes the one or more errors, where the reset operation comprises a hard reset operation that resets one or more settings that are unaffected by a soft refresh operation FIG. 5 shows a flowchart illustrating a method 500 that supports volatile register to detect power loss in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

Aspects of the method 500 may be implemented by a controller, among other components. Additionally or alternatively, aspects of the method 500 may be implemented as instructions stored in memory (e.g., firmware stored in a memory coupled with the memory system 110). For example, the instructions, when executed by a controller (e.g., the memory system controller 115), may cause the controller to perform the operations of method 500.

At 505, a first command may be received. The method may include receiving, from a host system, a first command to enter a first power mode having a lower power consumption than a second power mode. The operations of 505 may be performed in accordance with examples as disclosed herein. In some examples, aspects of the operations of 505 may be performed by a command receiver 425 as described with reference to FIG. 4.

At 510, data may be stored. The method may include storing, in a register associated with the memory system, data associated with the memory system. The operations of 510 may be performed in accordance with examples as disclosed herein. In some examples, aspects of the operations of 510 may be performed by a storage component 430 as described with reference to FIG. 4.

At 515, a second command may be received. The method may include receiving, from the host system, a second command to exit the first power mode based at least in part on storing the data. The operations of 515 may be performed in accordance with examples as disclosed herein. In some examples, aspects of the operations of 515 may be performed by an exit component 435 as described with reference to FIG. 4.

At 520, a reset operation may be performed. The method may include performing a reset operation to exit the first power mode based at least in part on determining whether the data stored in the register includes one or more errors based at least in part on receiving the second command. The operations of 520 may be performed in accordance with examples as disclosed herein. In some examples, aspects of the operations of 520 may be performed by an error detector 440 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving, from a host system, a first command to enter a first power mode having a lower power consumption than a second power mode, storing, in a register associated with the memory system, data associated with the memory system, receiving, from the host system, a second command to exit the first power mode based at least in part on storing the data, and performing a reset operation to exit the first power mode based at least in part on determining whether the data stored in the register includes one or more errors based at least in part on receiving the second command.

Some examples of the method 500 and the apparatus described herein may further include operations, features, circuitry, logic, means, or instructions for determining that the data includes the one or more errors based at least in part on receiving the second command, where the reset operation includes a hard reset operation that resets one or more settings that may be unaffected by a soft refresh operation.

In some examples of the method 500 and the apparatus described herein, performing the hard reset operation may include operations, features, circuitry, logic, means, or instructions for retrieving information from memory for the one or more settings that may be reset.

Some examples of the method 500 and the apparatus described herein may further include operations, features, circuitry, logic, means, or instructions for determining that the data fails to include the one or more errors based at least in part on receiving the second command, where performing the reset operation may be based at least in part on determining that the data fails to include the one or more errors.

Some examples of the method 500 and the apparatus described herein may further include operations, features, circuitry, logic, means, or instructions for determining that a power parameter of the memory system fails to satisfy a threshold based at least in part on determining that the data fails to include the one or more errors, where the reset operation includes a soft reset operation that refrains from resetting one or more settings that may be reset by a hard refresh operation, and where performing the soft reset operation may be based at least in part on determining the power parameter fails to satisfy the threshold.

For example, the apparatus described herein may further include operations, features, circuitry, logic, means, or instructions for performing the hard reset operation may be based at least in part on determining the power parameter fails to satisfy the threshold. In some cases, the apparatus described herein may further include operations, features, circuitry, logic, means, or instructions for performing the soft reset operation may be based at least in part on determining the power parameter satisfying the threshold.

Some examples of the method 500 and the apparatus described herein may further include that storing, in the register associated with the memory system, the data associated with the memory system occurs after entering the second power mode from the first power mode using the soft reset operation.

Some examples of the method 500 and the apparatus described herein may further include operations, features, circuitry, logic, means, or instructions for determining that a power parameter of the memory system satisfies a threshold based at least in part on determining that the data includes the one or more errors, where the reset operation includes a hard reset operation that resets one or more settings that may be unaffected by a soft refresh operation.

Some examples of the method 500 and the apparatus described herein may further include operations, features, circuitry, logic, means, or instructions for entering the first power mode based at least in part on storing the data, where receiving the second command may be based at least in part on entering the first power mode.

Some examples of the method 500 and the apparatus described herein may further include operations, features, circuitry, logic, means, or instructions for determining that a voltage of the memory system satisfies a threshold based at least in part on storing the data, where entering the first power mode may be based at least in part on determining that the voltage of the memory system satisfies the threshold.

Some examples of the method 500 and the apparatus described herein may further include operations, features, circuitry, logic, means, or instructions for exiting the first power mode based at least in part on performing the reset operation.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory system; and
   a control circuit coupled with the memory system and configured to cause the apparatus to:
   receive, from a host system, a first command to enter a first power mode having a lower power consumption than a second power mode;
   store, in a register associated with the memory system, data associated with the memory system;
   receive, from the host system, a second command to exit the first power mode based at least in part on storing the data; and
   perform a reset operation to exit the first power mode based at least in part on determining whether the data stored in the register includes one or more errors based at least in part on receiving the second command.

2. The apparatus of claim 1, wherein the control circuit is further configured to cause the apparatus to:
   determine that the data includes the one or more errors based at least in part on receiving the second command, wherein the reset operation comprises a hard reset operation that resets one or more settings that are unaffected by a soft refresh operation.

3. The apparatus of claim 2, wherein, to perform the hard reset operation, the control circuit is configured to cause the apparatus to:
   retrieve information from memory for the one or more settings that are reset.

4. The apparatus of claim 1, wherein the control circuit is further configured to cause the apparatus to:
   determine that the data fails to include the one or more errors based at least in part on receiving the second command, wherein performing the reset operation is based at least in part on determining that the data fails to include the one or more errors.

5. The apparatus of claim 4, wherein the control circuit is further configured to cause the apparatus to:
   determine that a power parameter of the memory system fails to satisfy a threshold based at least in part on determining that the data fails to include the one or more errors, wherein the reset operation comprises a soft reset operation that refrains from resetting one or more settings that are reset by a hard refresh operation, and wherein performing the soft reset operation is based at least in part on determining the power parameter fails to satisfy the threshold.

6. The apparatus of claim 5, wherein storing, in the register associated with the memory system, the data associated with the memory system occurs after entering the second power mode from the first power mode using the soft reset operation.

7. The apparatus of claim 1, wherein the control circuit is further configured to cause the apparatus to:
   determine that a power parameter of the memory system satisfies a threshold based at least in part on determining that the data includes the one or more errors, wherein the reset operation comprises a hard reset operation that resets one or more settings that are unaffected by a soft refresh operation.

8. The apparatus of claim 1, wherein the control circuit is further configured to cause the apparatus to:
   enter the first power mode based at least in part on storing the data, wherein receiving the second command is based at least in part on entering the first power mode.

9. The apparatus of claim 8, wherein the control circuit is further configured to cause the apparatus to:
   determine that a voltage of the memory system satisfies a threshold based at least in part on storing the data, wherein entering the first power mode is based at least in part on determining that the voltage of the memory system satisfies the threshold.

10. The apparatus of claim 1, wherein the control circuit is further configured to cause the apparatus to:
    exit the first power mode based at least in part on performing the reset operation.

11. A non-transitory computer-readable medium storing code, the code comprising instructions executable by a processor of an electronic device, cause the electronic device to:

receive, from a host system, a first command to enter a first power mode having a lower power consumption than a second power mode;

store, in a register associated with a memory system, data associated with the memory system;

receive, from the host system, a second command to exit the first power mode based at least in part on storing the data; and perform a reset operation to exit the first power mode based at least in part on determining whether the data stored in the register includes one or more errors based at least in part on receiving the second command.

12. The non-transitory computer-readable medium of claim 11, wherein the instructions, when executed by the processor of the electronic device, further cause the electronic device to:

determine that the data includes the one or more errors based at least in part on receiving the second command, wherein the reset operation comprises a hard reset operation that resets one or more settings that are unaffected by a soft refresh operation.

13. The non-transitory computer-readable medium of claim 12, wherein the instructions that, when executed by the processor of the electronic device, cause the electronic device to perform the hard reset operation, when executed by the processor of the electronic device, cause the electronic device to:

retrieve information from memory for the one or more settings that are reset.

14. The non-transitory computer-readable medium of claim 11, wherein the instructions, when executed by the processor of the electronic device, further cause the electronic device to:

determine that the data fails to include the one or more errors based at least in part on receiving the second command, wherein performing the reset operation is based at least in part on determining that the data fails to include the one or more errors.

15. The non-transitory computer-readable medium of claim 14, wherein the instructions, when executed by the processor of the electronic device, further cause the electronic device to:

determine that a power parameter of the memory system fails to satisfy a threshold based at least in part on determining that the data fails to include the one or more errors, wherein the reset operation comprises a soft reset operation that refrains from resetting one or more settings that are reset by a hard refresh operation, and wherein performing the soft reset operation is based at least in part on determining the power parameter fails to satisfy the threshold.

16. The non-transitory computer-readable medium of claim 15, wherein storing, in the register associated with the memory system, the data associated with the memory system occurs after entering the second power mode from the first power mode using the soft reset operation.

17. The non-transitory computer-readable medium of claim 11, wherein the instructions, when executed by the processor of the electronic device, further cause the electronic device to:

determine that a power parameter of the memory system satisfies a threshold based at least in part on determining that the data includes the one or more errors, wherein the reset operation comprises a hard reset operation that resets one or more settings that are unaffected by a soft refresh operation.

18. The non-transitory computer-readable medium of claim 11, wherein the instructions, when executed by the processor of the electronic device, further cause the electronic device to:

enter the first power mode based at least in part on storing the data, wherein receiving the second command is based at least in part on entering the first power mode.

19. The non-transitory computer-readable medium of claim 18, wherein the instructions, when executed by the processor of the electronic device, further cause the electronic device to:

determine that a voltage of the memory system satisfies a threshold based at least in part on storing the data, wherein entering the first power mode is based at least in part on determining that the voltage of the memory system satisfies the threshold.

20. The non-transitory computer-readable medium of claim 11, wherein the instructions, when executed by the processor of the electronic device, further cause the electronic device to:

exit the first power mode based at least in part on performing the reset operation.

21. A method performed at a memory system, comprising:

receiving, from a host system, a first command to enter a first power mode having a lower power consumption than a second power mode;

storing, in a register associated with the memory system, data associated with the memory system;

receiving, from the host system, a second command to exit the first power mode based at least in part on storing the data; and performing a reset operation to exit the first power mode based at least in part on determining whether the data stored in the register includes one or more errors based at least in part on receiving the second command.

22. The method of claim 21, further comprising:

determining that the data includes the one or more errors based at least in part on receiving the second command, wherein the reset operation comprises a hard reset operation that resets one or more settings that are unaffected by a soft refresh operation.

23. The method of claim 22, wherein performing the hard reset operation comprises:

retrieving information from memory for the one or more settings that are reset.

24. The method of claim 21, further comprising:

determining that the data fails to include the one or more errors based at least in part on receiving the second command, wherein performing the reset operation is based at least in part on determining that the data fails to include the one or more errors.

25. The method of claim 24, further comprising:

determining that a power parameter of the memory system fails to satisfy a threshold based at least in part on determining that the data fails to include the one or more errors, wherein the reset operation comprises a soft reset operation that refrains from resetting one or more settings that are reset by a hard refresh operation, and wherein performing the soft reset operation is based at least in part on determining the power parameter fails to satisfy the threshold.

* * * * *